United States Patent
Petrie et al.

(10) Patent No.: US 9,391,953 B2
(45) Date of Patent: Jul. 12, 2016

(54) METHOD, DEVICE, AND SYSTEM FOR NOTIFYING MOBILE STATIONS PARTICIPATING IN A NON-LLE CALL OF NEW LLE CALL

(71) Applicant: MOTOROLA SOLUTIONS, INC, Schaumburg, IL (US)

(72) Inventors: Michael C Petrie, Hoffman Estates, IL (US); Harish Natarahjan, Streamwood, IL (US); Thomas J Senese, Schaumburg, IL (US)

(73) Assignee: MOTOROLA SOLUTIONS, INC., Schaumburg, IL (US)

(*) Notice: Subject to any disclaimer, the term of this patent is extended or adjusted under 35 U.S.C. 154(b) by 120 days.

(21) Appl. No.: 14/338,836

(22) Filed: Jul. 23, 2014

(65) Prior Publication Data

US 2016/0029348 A1   Jan. 28, 2016

(51) Int. Cl.
    *H04L 29/06* (2006.01)
(52) U.S. Cl.
    CPC ..................................... *H04L 63/00* (2013.01)
(58) Field of Classification Search
    None
    See application file for complete search history.

(56) References Cited

U.S. PATENT DOCUMENTS

| 2003/0131236 A1* | 7/2003 | Sasmazel ............ H04L 63/0414 |
| | | 713/171 |
| 2004/0120527 A1 | 6/2004 | Hawkes et al. |
| 2006/0115088 A1* | 6/2006 | Valentine .................. H04L 9/12 |
| | | 380/270 |
| 2007/0189535 A1 | 8/2007 | Lee et al. |
| 2010/0146266 A1* | 6/2010 | Chen .................... H04L 63/0428 |
| | | 713/160 |
| 2013/0243195 A1 | 9/2013 | Kruegel et al. |

FOREIGN PATENT DOCUMENTS

| EP | 1638355 B1 | 1/2014 |
| WO | 2012087922 A1 | 6/2012 |
| WO | 2013085694 A1 | 6/2013 |

* cited by examiner

*Primary Examiner* — Diane Lo
(74) *Attorney, Agent, or Firm* — Daniel R. Bestor (57) ABSTRACT

A method of interoperating link layer encrypted (LLE) and non-LLE communications in a radio network include receiving, at a radio controller (RC), a new call request for an LLE call, determining that there are one or more currently active non-LLE calls, and causing a message to be transmitted on each channel carrying one of the one or more currently active non-LLE calls informing mobile stations (MSs) participating in the non-LLE calls that a new LLE call has been or is-to-be granted. MSs participating in one of the non-LLE calls and receiving the message determine from the message or via a call grant obtained via a control channel, whether the new LLE call is of interest, and if so, switching to a channel assigned to the new LLE call and participating in the new LLE call.

20 Claims, 8 Drawing Sheets

METHOD, DEVICE, AND SYSTEM FOR NOTIFYING MOBILE STATIONS PARTICIPATING IN A NON-LLE CALL OF NEW LLE CALL

BACKGROUND OF THE INVENTION

Wireless communication systems provide for radio communication links to be arranged within the system between a plurality of user terminals. Such user terminals may be mobile and may therefore be known as 'mobile stations.' At least one other terminal, e.g. used in conjunction with mobile stations, may be a fixed terminal, e.g. a control terminal, base station, or access point. Such a system typically includes a system infrastructure which generally includes a network of various fixed installations such as base stations, which are in direct radio communication with the mobile stations. Each of the base stations operating in the system may have one or more transceivers which may, for example, serve mobile stations in a given local region or area, known as a 'cell' or 'site', by radio frequency (RF) communication. The mobile stations which are in direct communication with a particular base station are said to be served by the base station, and all radio communications to and from each mobile station within the system are made via respective serving base stations. Sites of neighbouring base stations in a wireless communication system may be offset from one another or may be overlapping.

Wireless communication systems may operate according to an industry standard land mobile radio (LMR) protocol such as, for example, the Project 25 (P25) standard defined by the Association of Public Safety Communications Officials International (APCO), or other radio protocols. Further details regarding the P25 standards can be obtained from the Telecommunications Industry Association, 2500 Wilson Boulevard, Suite 300 Arlington, Va. Communications in accordance with P25 or other standards may take place over physical channels in accordance with one or more of a TDMA (time division multiple access) protocol, a FDMA (frequency divisional multiple access), or CDMA (code division multiple access) protocol. Mobile stations in wireless communication systems such as P25 systems send and receive user communicated speech and other data, herein referred to collectively as 'traffic information', in accordance with the designated protocol.

Furthermore, LMR systems may operate in either a conventional or trunked configuration. In either configuration, a plurality of mobile stations may be partitioned into separate groups of mobile stations, such that mobile stations may selectively participate in individual (mobile station to mobile station) calls and also in group (mobile station to many mobile stations) calls.

In a conventional system, each mobile station in a group is selected to a particular frequency for communications associated with that mobile station's group. Thus, each group is served by one frequency (e.g., channel), and multiple groups may share the same single frequency (in which case, in some embodiments, group IDs may be present in the group data to distinguish between groups using the same shared frequency). In some systems, each conventional frequency may be further configured to carry multiple channels via a TDMA protocol, which allows for multiple concurrent calls on each frequency based on the configured ratio of the TDMA channels.

In contrast, a trunked radio system and its mobile stations use a pool of traffic channels (e.g., FDMA or TDMA protocols operating on a plurality of available frequencies) for virtually an unlimited number of groups of mobile stations (e.g., talkgroups). Thus, all groups are served by all channels. The trunked radio system works to take advantage of the probability that not all groups need a traffic channel for communication at the same time. When a member of a group requests a call on a control or rest channel on which all of the mobile stations in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile stations were idling to a traffic channel for the call, and instruct all mobile stations that are not participating in the new call to move to a newly assigned control or rest channel selected from the pool of available channels. With a given number of channels, a much greater number of groups can be accommodated in a trunked system as compared with conventional radio systems.

Group members for group calls conducted on conventional or trunked systems may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile stations) could be provisioned in the network by the user or an agent, and then provided some form of group identity, identifier, or address, for example. Then, at a future time, an originating user in a group may cause some signalling to be transmitted indicating that he or she wishes to establish a communication session (e.g., group call) with each of the pre-designated participants in the defined group. In another example, mobile stations may dynamically affiliate with a group (and also disassociate with the group) perhaps based on user input, and the switching and/or radio network may track group membership and route new group calls according to the current group membership. In a still further example, mobile stations participating in a first group or individual call may monitor traffic channel signalling to determine if another higher priority group or individual is active or about to start which would cause the mobile station to leave the current call before it is completed in order to join the higher priority call.

Many wireless communication systems, including many LMR systems in general and many P25 systems in particular, employ a procedure to encrypt sensitive communicated traffic information, especially where the information is sent via insecure channels, e.g. by wireless communication over-the-air. For example, in some wireless communication systems, communications can be end-to-end encrypted. This means that encryption of traffic information is applied by an original transmitting terminal of the sender (source) of the traffic information and removed by a final receiving terminal of the recipient (destination) of the traffic information. Intermediate terminals that facilitate the delivery of the encrypted traffic information are unable to decrypt the encrypted traffic information (or at least, are unable to do so in a reasonable amount of time).

In addition to end-to-end encryption, link layer encryption (LLE) may be used between individual links in a path from a source transmitter to a destination receiver to further prevent the interception or monitoring of traffic information transmitted over-the-air, such as between mobile stations and base stations. For example, even when end-to-end encryption is used to encrypt digitized voice data, some control and/or signalling data is necessarily sent unencrypted over-the-air to allow the receiving device (such as the base station or mobile station) to identify a sender or receiver, group ID, or to obtain information such as an algorithm ID or key ID sufficient to begin decrypting the end-to-end encrypted voice data. LLE may be used, for example, to encrypt over-the-air communication links between mobile stations and base stations, and advantageously prevent an eavesdropper from intercepting information transmitted over-the-air, such as group ID's, transmitter ID's, target ID's, algorithm IDs, key IDs, or other control information.

Figure 1:
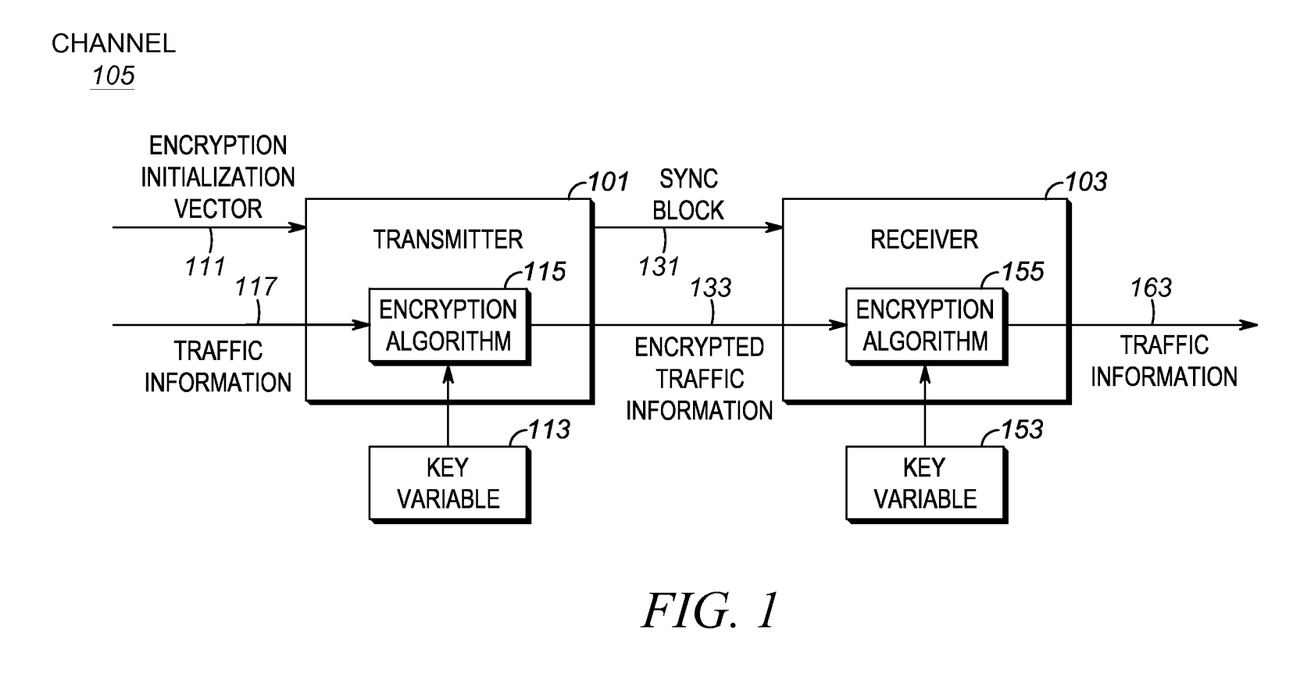
FIG. 1 is a block diagram illustrative of a conventional encryption/decryption system.

FIG. 1 illustrates an example of how encryption may be achieved between a transmitter 101 and receiver 103 over an intervening channel 105 (e.g., air-interface) by producing a random or pseudo-random data sequence of binary digits (e.g., an encryption initialization vector 111) and using a combining procedure (e.g., an encryption algorithm 115) to combine the encryption initialization vector 111 with a secret key variable 113 supplied by the user. The combination generates another data sequence, known as a keystream, incorporating the secret key variable 113. The keystream, or a portion of it, is then used internally by the encryption algorithm 115 to encrypt the traffic information 117 to be transmitted in encrypted form as encrypted traffic information 133. This is done in an encryption processor by using a combination procedure, such as an XOR (exclusive OR) combination procedure, to combine the unencrypted traffic information 117 with the keystream, e.g. on a frame-by-frame basis. The encryption initialization vector 111 may be loaded into a linear feedback shift register (LFSR), for example, and may be clocked to provide a time-varying keystream.

The secret key variable 113 used at the transmitter 101 is known at the receiver 103 and is thus never transmitted openly (e.g., unencrypted). The receiver 103 is sent the encryption initialization vector 111, an identifier identifying the encryption algorithm 115 used at the transmitter 101 (assuming it is not hardcoded in both transmitter 101 and receiver 103), and an identifier identifying the key variable 113 used at the transmitter 101 (assuming it is not hardcoded in both transmitter 101 and receiver 103) via a sync block 131 transmitted over the channel 105 and included in one or more of a header information structure or embedded in a data payload frame. The transmitter 101 also transmits the encrypted traffic information 133 over the channel 105 for reception by the receiver 103. The receiver 103 is thereby able to re-construct the keystream applied at the transmitter 101. The receiver 103 combines the reconstructed keystream with the encrypted traffic 133 it receives in a manner such that the keystream included in the encrypted traffic 133 is cancelled allowing the original user traffic 163 to be extracted in unencrypted form. For example, the receiver 103 may use a same clocked LFSR as used by the transmitter 101 to provide a same time-varying keystream using the retrieved encryption initialization vector 111 transmitted in the sync block 131.

The encryption/decryption process therefore typically includes (i) operation of an encryption algorithm in a processor of a transmitting terminal to encrypt the information to be transmitted, and (ii) operation of a related decryption algorithm in a receiving terminal to decrypt the received encrypted traffic information.

Typically, radio systems supporting LLE do so on a call by call and/or group by group basis. In other words, LLE encrypted individual or group-based calls are assigned to a (at least temporarily) dedicated LLE channel for the duration of the call and on which only LLE-capable mobile stations can participate, while non-LLE encrypted individual or group-based calls are assigned to a (at least temporarily) dedicated non-LLE channel for the duration of the call and on which LLE-capable and non-LLE-capable mobile stations can participate. One problem that has arisen with this division between LLE and non-LLE calls in radio systems supporting both LLE-capable calls and non-LLE-capable calls, is that a mobile station that is subscribed to an LLE group and a non-LLE group, and is currently participating in a non-LLE individual call or non-LLE group call with non-LLE group members, may miss an LLE individual or group call that keys up during the non-LLE call. In many cases, the LLE call may be a higher priority call than the non-LLE call, but because there is no signalling mechanism to securely signal non-LLE call participants of the LLE call, non-LLE call participants that are subscribed to both the LLE group and non-LLE group, or that are capable of conducting both LLE and non-LLE individual calls, remain on the non-LLE call until it completes, after which time it may join the LLE call using a late entry mechanism.

Accordingly, what is needed is an improved method, device, and system for securely notifying mobile stations participating in non-LLE calls of the existence and/or identity of a new LLE call, so that mobile stations that are dual-subscribed to both LLE groups and non-LLE groups, and/or capable of participating in LLE and non-LLE individual calls, can make an informed determination of whether or not to continue in the non-LLE call.

DETAILED DESCRIPTION OF THE INVENTION

Disclosed is an improved method, apparatus, and system for securely notifying mobile stations participating in non-LLE group calls of the existence and/or identity of a new LLE group call, so that mobile stations that are dual-subscribed to both LLE groups and non-LLE groups can make an informed determination of whether or not to continue in a non-LLE group call.

In one embodiment, a method of interoperating link layer encrypted (LLE) and non-LLE communications in a radio network includes receiving, at a radio controller, a new call request requesting an LLE call, determining, by the radio controller, that there are one or more currently active non-LLE calls, and causing, by the radio controller, a message to be transmitted on each channel carrying one of the one or more currently active non-LLE calls informing mobile stations participating in the non-LLE calls that a new LLE call has been or is-to-be granted.

In another embodiment, a mobile station in a radio network includes a transceiver, a processor, and a computer readable medium having instructions stored thereon that, in response to execution by the processor, cause the radio controller to perform operations comprising: participating in an active non-link layer encrypted (LLE) call on a first channel, receiving, via the transceiver during the call on the first channel, a message indicating that a new LLE call has been or is-to-be granted in the radio network, determining, from one or both of (i) contents of the message and (ii) contents of an LLE-encrypted call grant received on a control channel in the radio network after switching from the first channel to the control channel in response to receiving the message, whether the new LLE call is of interest, and responsive to determining that the new LLE call is of interest, switching the transceiver to a channel assigned to the new LLE call and participating in the new LLE call.

Each of these embodiments will be discussed in more detail below, starting with example network and device architectures of the system in which the embodiments may be applied, followed by a discussion of notifying mobile stations in a non-LLE call of a newly granted or to-be-granted LLE call from the viewpoint of the radio controller and the mobile station, respectively.

I. NETWORK AND DEVICE ARCHITECTURE

Figure 2:
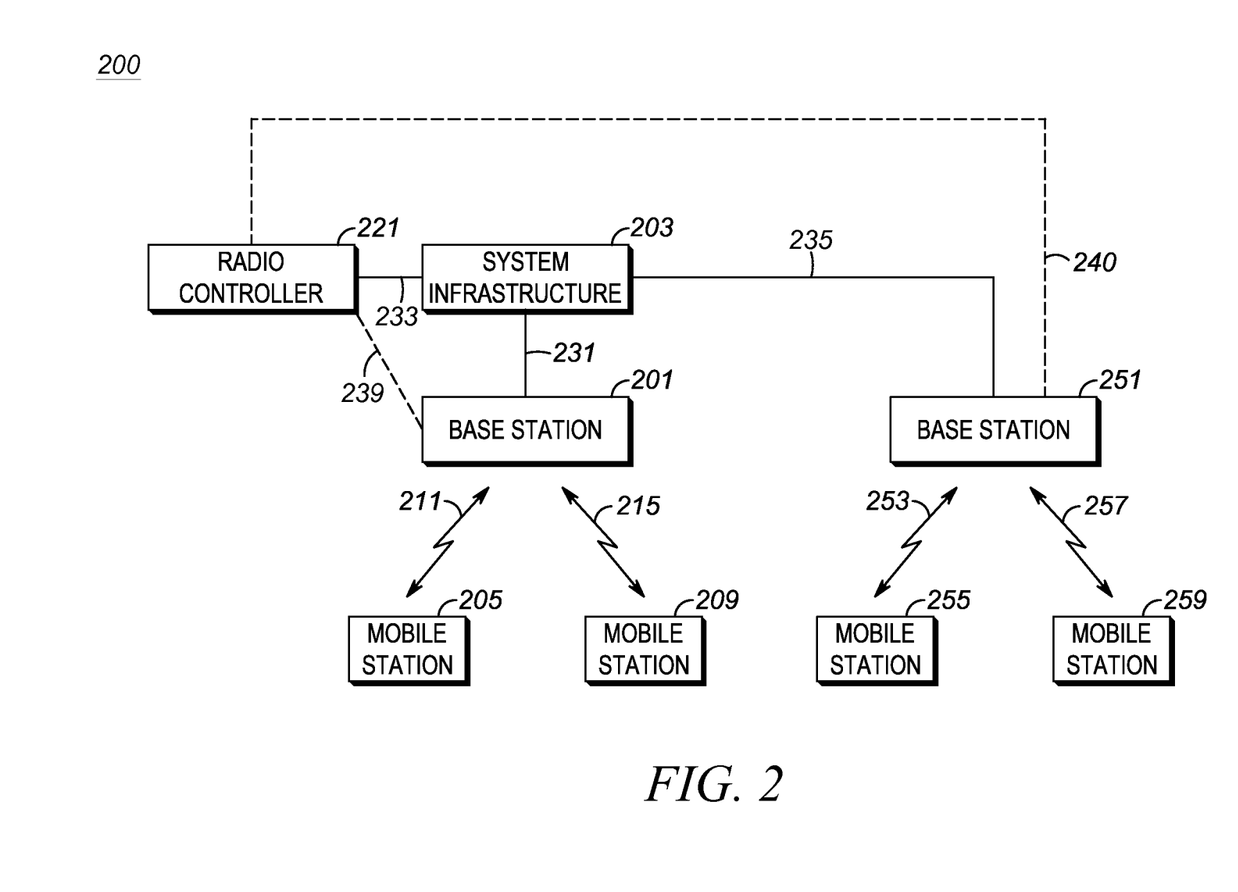
FIG. 2 is a schematic diagram of a wireless communication system in accordance with an embodiment.

FIG. 2 shows a wireless radio communication system 200 that may be adapted in accordance with an embodiment of the disclosure. It will be apparent to those skilled in the art that the system 200 and the components that are to be described as operating therein may take a number of forms well known to those skilled in the art. Thus, the layout of the system 200, and of its operational components to be described, should be regarded as illustrative rather than limiting. The system 200 of FIG. 2 will be described as an illustrative wireless communication system such as a system capable of operating in accordance with the P25 standard, but may be equally applied to other currently known and/or future standards protocols, such as Digital Mobile Radio (DMR) or others.

The system 200 shown in FIG. 2 includes one or more base stations 201, 251 operably connected to a system infrastructure 203 via respective wired or wireless links 231, 235. As used herein, the term "base station" (BS) refers to any entity that includes a transmitter and/or receiver to perform the functionality of receiving traffic information (voice, images, video, text, etc.) from a signal source (e.g. mobile station 205) and transmitting it to one or more signal destinations (e.g, mobile station 209, mobile station 255, system infrastructure 203, etc.). For example, the BS 201 may comprise, among other possibilities, a cellular wireless base station, a two-way radio repeater, an IEEE 802-based wireless access points, or other similar devices.

The BS 201 has radio links with a plurality of mobile stations, particularly mobile stations (MSs) in a service cell or site at least partially defined by a geographic location of the BS 201. In addition to MSs, BS 201 may maintain a direct wireless or wired link 239 (or indirect via system infrastructure 203) with a radio controller 221 or other radio network communications device (such as a zone controller). While the radio controller 221 is illustrated as a separate entity in the system 200, in other embodiments, the radio controller 221 may be integrated with other devices (such as a zone controller) in system infrastructure 203 and/or may be integrated into one or more of BSs 201, 251. The radio controller 221 may be configured to provide registration, authentication, encryption, routing, and/or other services to BS 201 so that mobile stations operating within its coverage area may communicate with other mobile stations in the system 200. The radio controller 221 may also track or have access to group subscription information that, for each group identifier associated with a particular group of radios (e.g., talkgroup), identifies mobile stations (e.g., by hardware ID, hardware MAC address, IP address, radio ID, International Mobile Subscriber Identity (IMSI), a serial number, or some other unique identifier that can be used to identify subscribed member mobile stations) that are members of the particular group of radios. Additionally or alternatively, the radio controller 221 may also track or have access to call activity information that indicates whether a call is currently active for each group identifier and, if so, whether each currently active call is LLE encrypted or not. Even further, radio controller 221 may track priority information associated with each group identifier, perhaps pre-set by a system administrator or installer, or dynamically adjustable via administrative access from mobile stations or dispatch consoles in the system 200, that relatively ranks a priority of each group identifier (and hence, talkgroup) relative to one another. Other types of information could be tracked or made accessible to radio controller 221 as well.

Two MSs 205, 209 are illustrated in FIG. 2 as being within the service area of, and being registered with, BS 201 via respective radio links 211, 215. The radio links 211, 215 may operate according to a trunked FDMA or TDMA LMR protocol, for example, or some other air-interface protocol. The BS 201 thereby serves MSs including the MSs 205, 209 with radio communications to and from other terminals, including (i) MSs served by the BS 201, (ii) MSs served by other BSs such as BS 251, (iii) other terminals including MSs in other systems (not shown) operably linked to the system 200 via the system infrastructure 203, and (iv) a console (not shown).

BS 251 similarly has radio links with a plurality of MSs, particularly MSs in a service cell or site at least partially defined by a geographic location of the BS 251. In addition to MSs, BS 251 may maintain a direct wireless or wired link 240 (or indirect via system infrastructure 203) with the radio controller 221. The radio controller 221 may be similarly configured to provide registration, authentication, encryption, routing, and/or other services to BS 251 so that mobile stations operating within its coverage area may communicate with other mobile stations in the system. Two MSs 255, 259 are illustrated in FIG. 2 as being within the service area of, and being registered with, BS 251 via respective radio links 253, 257. The radio links 253, 257 may operate according to a trunked FDMA or TDMA LMR protocol, or some other air-interface protocol, for example. The BS 251 thereby serves MSs including the MSs 255, 259 with radio communications to and from other terminals, including (i) MSs served by the BS 251, (ii) MSs served by other BSs such as BS 201, (iii) other terminals including MSs in other systems (not shown) operably linked to the system 200 via the system infrastructure 203, and (iv) a console (not shown).

The system infrastructure 203 includes known sub-systems (not shown) required for operation of the system 200.

Such sub-systems may include, for example, sub-systems providing additional authentication, routing, registration, location, system management, encryption, and other operational functions within the system 200. The system infrastructure 203 may also provide routes to other BSs (not shown) providing cells serving other MSs, and/or may provide access to other types of networks such as a plain old telephone system (POTS) network or a data-switched network such as the Internet. The system infrastructure 203 may also maintain a separate link 233 to the radio controller 221.

Figure 3:
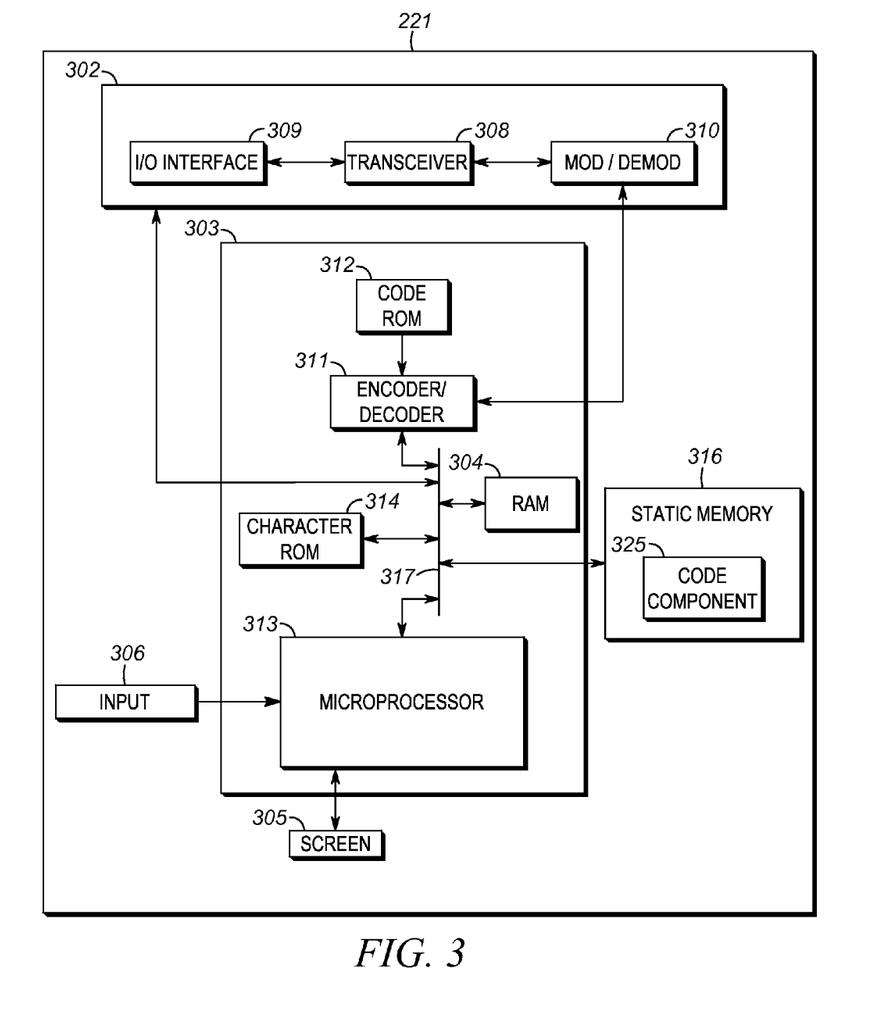
FIG. 3 is a block diagram of an illustrative layout of a radio controller of the system of FIG. 2 in accordance with an embodiment.

FIG. 3 is an example functional block diagram of a radio controller 221 operating within the system 200 of FIG. 2 in accordance with some embodiments. As shown in FIG. 3, radio controller 221 includes a communications unit 302 coupled to a common data and address bus 317 of a processing unit 303. The radio controller 221 may also include an input unit (e.g., keypad, pointing device, etc.) 306 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received between the radio controller and BSs or MSs in the system 200. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include one or more wired or wireless input/output (I/O) interfaces 309 that are configurable to communicate with MSs such as MSs 205, 209, with BSs such as BSs 201, 251, and/or with the system infrastructure 203. The communications unit 302 may include one or more wireless transceivers 308, such as a Digital Mobile Radio (DMR) transceiver, an APCO P25 (P25) transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 302 may additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as LLE encryption notifications, control channel messages, and/or data or voice messages. Static memory 316 may store operating code for the microprocessor 313 that, when executed, performs one or more of the steps set forth in FIG. 5 and the accompanying text.

Static memory 316 may also store, permanently or temporarily, group subscription information that, for each group identifier associated with a particular group of radios, identifies mobile stations that are members of the particular group of radios. Additionally or alternatively, static memory 316 may also store, permanently or temporarily, call activity information that indicates whether a call is currently active for each group identifier and, if so, whether the currently active call is encrypted or not. Even further, static memory 316 may store, permanently or temporarily, priority information associated with each group identifier that relatively ranks a priority of each group identifier (and hence, talkgroup) relative to one another. Other types of information could be tracked and/or stored in static memory 316 as well.

Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 4:
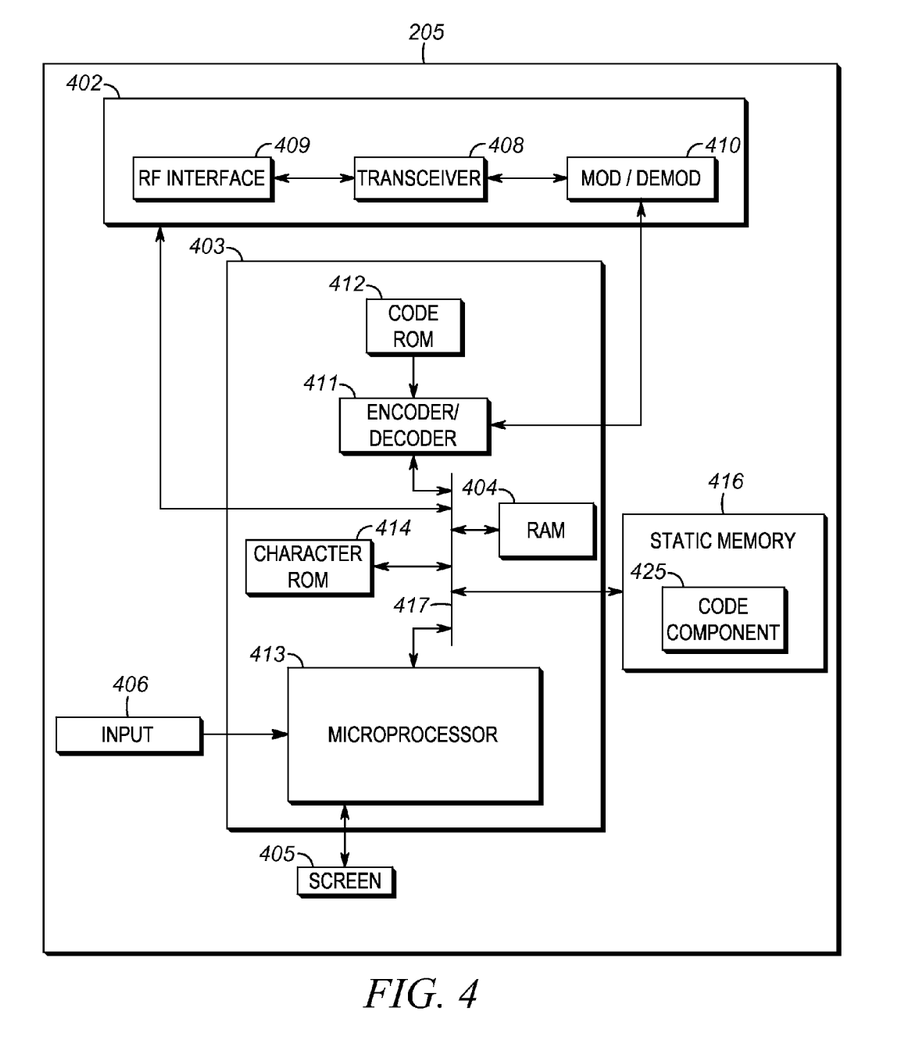
FIG. 4 is a block diagram of an illustrative layout of a mobile station of the system of FIG. 2 in accordance with an embodiment.

FIG. 4 is an example functional block diagram of a mobile station such as MS 205 operating within the system 200 of FIG. 2 in accordance with some embodiments. Other MSs such as MSs 209, 255, and 259 may contain same or similar structures. As shown in FIG. 4, MS 205 includes a communications unit 402 coupled to a common data and address bus 417 of a processing unit 403. The MS 205 may also include an input unit (e.g., keypad, pointing device, etc.) 406 and a display screen 405, each coupled to be in communication with the processing unit 403.

The processing unit 403 may include an encoder/decoder 411 with an associated code ROM 412 for storing data for encoding and decoding voice, data, control, LLE channel notification messages, and/or other signals that may be transmitted or received by MS 205. The processing unit 403 may further include a microprocessor 413 coupled, by the common data and address bus 417, to the encoder/decoder 411, a character ROM 414, a RAM 404, and a static memory 416.

The communications unit 402 may include an RF interface 409 configurable to communicate with other MSs such as MSs 209, 255, 259 and with BSs such as BSs 201, 251. The communications unit 402 may include one or more wireless radio transceivers 408, such as a DMR transceiver, a P25 transceiver, a TETRA transceiver, a Bluetooth transceiver, an LTE transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 408 is also coupled to a combined modulator/demodulator 410 that is coupled to the encoder/decoder 411.

The microprocessor 413 has ports for coupling to the input unit 406 and to the display screen 405. The character ROM 414 stores code for decoding or encoding data such as LLE channel notification messages, control channel messages and/or data or voice messages that may be transmitted or received by the MS 205. Static memory 416 may store operating code for the microprocessor 413 that, when executed, performs one or more of the steps set forth in FIG. 8 and corresponding text. Static memory 416 may comprise, for example, a HDD, an optical disk drive such as a CD drive or DVD drive, a SSD, a tape drive, a flash memory drive, or a tape drive, to name a few.

II. PROCESS OF NOTIFYING MOBILE STATIONS IN A NON-LLE CALL OF A NEWLY GRANTED OR TO-BE-GRANTED LLE CALL

Figure 5:
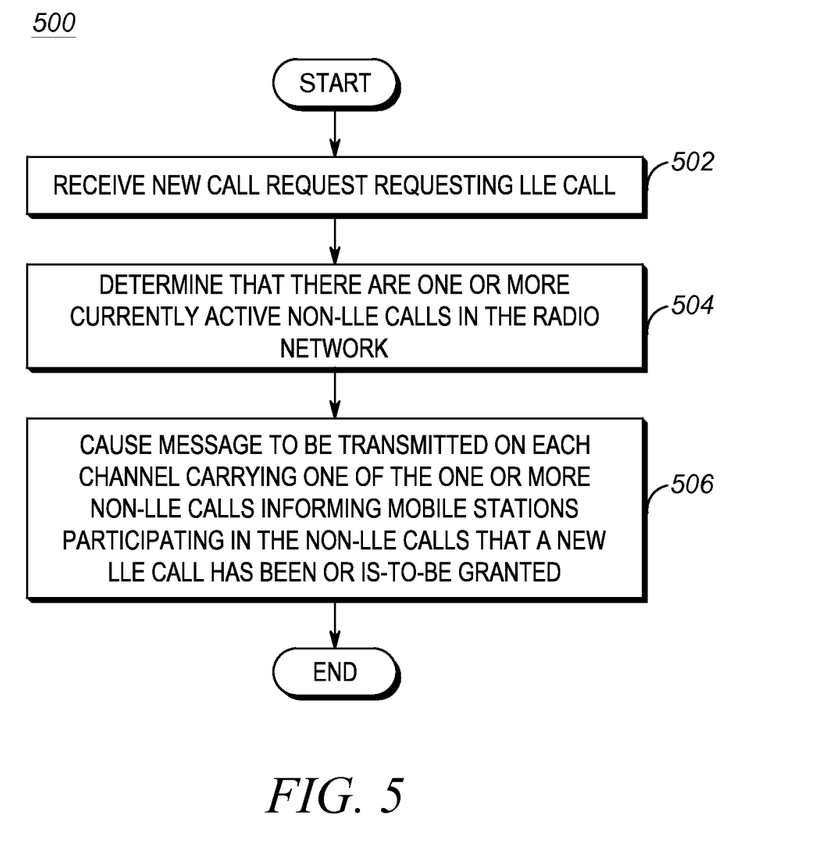
FIG. 5 is a flow chart setting forth an example process of a radio controller notifying mobile stations in a non-LLE call of a newly granted or to-be-granted LLE call in accordance with an embodiment.

As set forth above, a radio controller, such as radio controller 221 of FIG. 2, may perform one or more steps for notifying mobile stations in a non-LLE call of a newly granted or to-be-granted LLE call. FIG. 5 sets forth a process 500 illustrating such steps.

At step 502, the radio controller receives a new call request requesting a new LLE group or individual call. The new call request may specify a particular group that is an "LLE talkgroup," in other words, all calls associated with the particular group are encrypted over the air using a predetermined encryption algorithm and key variable shared between mobile stations and base stations/radio controllers in the system. In other embodiments, the particular group may support both encrypted and unencrypted calls, and a bit setting in the new group call request set by the requesting device may indicate whether the call traffic will be LLE encrypted or not. In still other examples, the new call request may be for an individual call and may specify that it is to be an encrypted individual call. Other possibilities exist as well. In this example, it is assumed that the new call request at step 502 is associated with an LLE group, includes a bit setting indicating that the call will be encrypted, or otherwise requests LLE encryption in some other manner. The new call request may be, for example, transmitted over a trunked control or rest (FDMA or TDMA) channel in a trunked system and forwarded to the radio controller by a control or rest channel base station assigned to that control or rest channel (e.g., permanently or temporarily). Other examples are possible as well. It is assumed that the radio controller determines to grant the new call request or determines that it will grant the new call request at step 502, perhaps after performing some other steps, such as authorization of the call or requesting device, after sufficient capacity checks (internal processing power and channel availability), etc.

At step 504, the radio controller determines whether there are one or more currently active non-LLE group or individual calls in the system. The radio controller may do so by accessing a local data store that includes active call information, or by retrieving active call information from another processing device in the system, such as a zone controller. A currently active non-LLE call may be any unencrypted call that has been granted and has not yet been explicitly terminated and/or has not yet passed beyond an associated call hangtime duration. If the radio controller determines that there are no currently active non-LLE calls, no notice of the LLE call needs to be provided over an unsecured medium, and the process 500 may thus terminate. In some embodiments, the radio controller may also determine whether there are any already active LLE calls and, if so, provide notice of the newly granted or to-be-granted LLE call on the already active LLE channels, perhaps using same or similar methods to those disclosed herein, albeit on an LLE encrypted channel.

At step 506, the radio controller causes a message to be transmitted on each channel carrying one of the one or more non-LLE (e.g., clear or unencrypted at the link layer) calls informing mobile stations participating in the non-LLE calls that a new LLE group or individual call has been or is-to-be granted. Depending on the type of radio protocol used, including whether it is a TDMA or FDMA protocol, the message may be embedded in unencrypted call data or call audio of the active non-LLE group call (e.g., via embedded link control messages), transmitted in a signalling space available on the same channel as the active non-LLE group call (e.g., as in a periodic or semi-periodic sync field or embedded signalling field such as a terminator link control message), transmitted during a call hang time of the active non-LLE group call, transmitted in a MAC packet data unit (PDU) in a slow associated control channel (SACCH) or fast associated control channel (FACCH) signalling space associated with the active non-LLE group call, transmitted in an embedded low speed data slot on the same channel as the active non-LLE group call, or transmitted via some other information conveying mechanism on the same channel as the active non-LLE group call. In some TDMA radio systems, the message may also be transmitted in a traffic channel adjacent the current traffic channel (if available). Other possibilities exist as well.

The message may be encrypted or unencrypted. If encrypted, perhaps using a same key and algorithm used to LLE encrypt voice and/or data traffic in the system, the message may explicitly identify the target mobile station (for an individual call) or target group address (for a group call) identified in the new call request and/or traffic channel(s) assigned to the new call and on which the new call will be communicated. If unencrypted, the message may explicitly identify one or more of the target mobile station (for an individual call) or target group address (for a group call) identified in the new call request and/or traffic channel(s) assigned to the new call and on which the new call will be communicated, or may refrain from including such information and, instead, include one or more index numbers that are modified or incremented for each new LLE group call granted. By including information regarding target group address or target identifier and assigned traffic channel(s) for the new call, mobile stations participating in the non-LLE group call can make a determination of whether to leave the non-LLE group call (e.g., whether the newly granted LLE call is a higher priority than the non-LLE group call and/or whether it is subscribed to the target group address indicated in the message), and switch directly from the channel on which the non-LLE group call is being carried to the channel assigned to the newly granted or to-be-granted LLE group call. By not including such information (e.g., by not specifically identifying the requested LLE call over the non-LLE channel(s)), security can be improved, but at the expense of requiring the mobile stations operating on the non-LLE channel to either return to a control or rest channel to receive an encrypted call grant associated with the requested new LLE group call (e.g., in order to obtain the target group address and channel assignment(s) information), or scan other channels for the encrypted call grant associated with the requested new LLE group call.

Figure 6A:
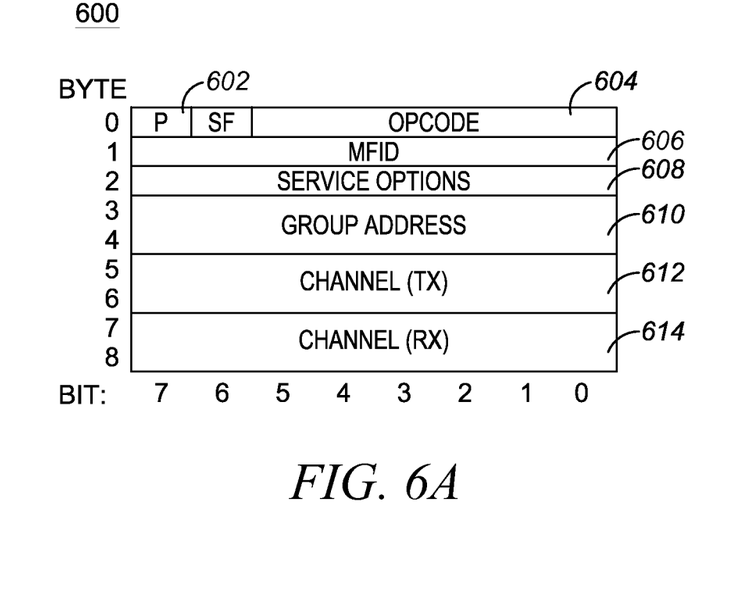
FIGS. 6A and 6B are block diagrams illustrating example encrypted LLE call notification outgoing signalling packets in accordance with an embodiment.
Figure 6B:
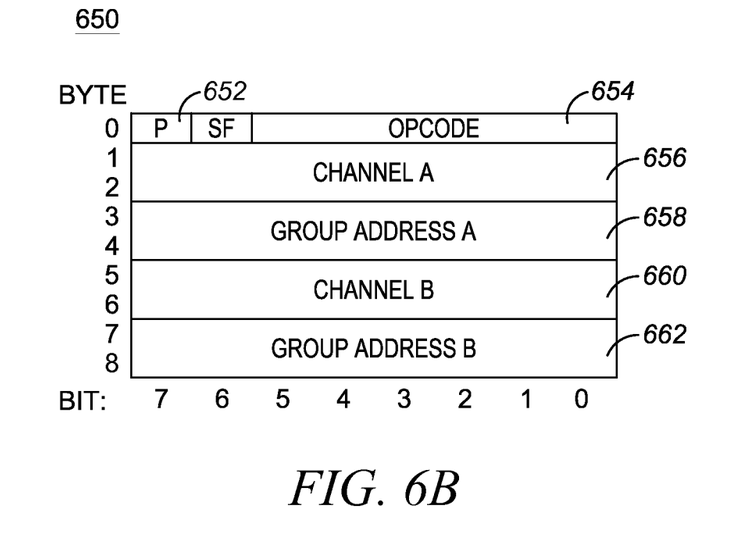
Figure 7:
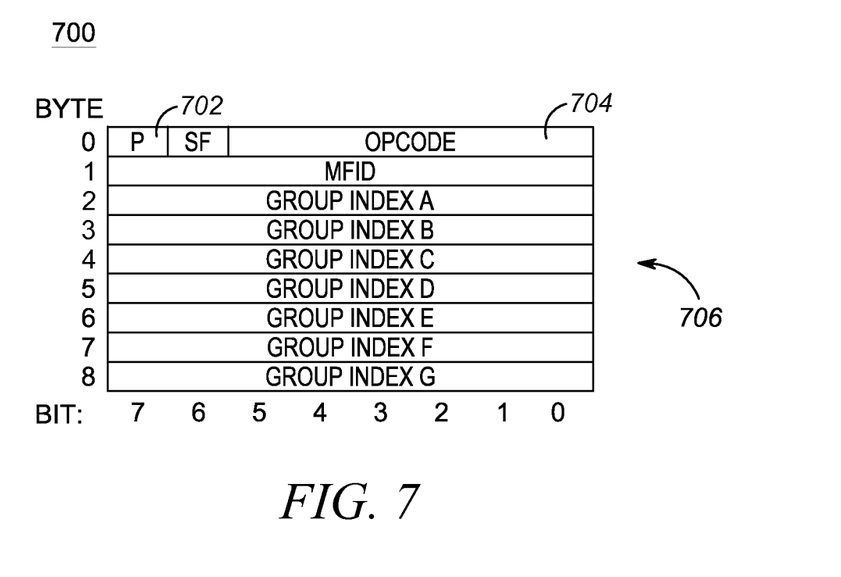
FIG. 7 is a block diagram illustrating an example unencrypted LLE call notification outgoing signalling packets in accordance with an embodiment.

FIGS. 6A, 6B, and 7 set forth example link control (LC) messages consistent with the P25 standard that could be used as the message transmitted at step 506 of process 500. Signalling similar in structure and/or effect could be implemented in other messaging mechanisms, including MAC PDUs, as well.

FIG. 6A illustrates an encrypted LLE group voice channel update explicit LC 600 that may be transmitted consistent with an embodiment of this disclosure. Field 602 is a "protected" field (P) that is set to a value of "1" to indicate that this LC is LLE encrypted (e.g., that octets 1-8 are LLE encrypted). The SF field indicates whether the LC has an implicit or explicit format, which in this case is set to a "0" to indicate that it is explicit (e.g., explicit receive and transmit frequency designations are required). The opcode field 604 may be set to a value of "000100" to indicate that it is an explicit group voice channel update consistent with the P25 standard, or to a proprietary or newly assigned value to more specifically indicate that it is an LLE encrypted explicit group voice channel update. The MFID field may be set to a proprietary value associated with a particular manufacturer feature set that includes the LLE encrypted group voice channel update explicit LC 600. The service options field 608 may set forth additional service options commensurate with the P25 standard, including for example, a priority indication that indicates an associated priority of the new LLE group call indicated in the message. The group address field 610 sets forth the target group address indicated in the new LLE group call request that was or is-to-be granted by the radio controller.

The channel transmit (TX) field 612 identifies the frequency and/or time slot of the channel on which the transmit portion of the new LLE group call has been or is-to-be assigned. The channel receive (RX) field 614 identifies the frequency and/or time slot of the channel on which the receive portion of the new LLE group call has been or is-to-be assigned. In those radio networks that include multiple BSs covering multiple geographic areas over which the newly granted LLE group call will be conducted, different LLE group voice channel update explicit LCs 600 identifying different channels may be transmitted by each corresponding BS in the system carrying the newly granted LLE group call (while still identifying the same new group address in field 610).

FIG. 6B illustrates an encrypted LLE group voice channel update implicit LC 650 that may be transmitted consistent with another embodiment of this disclosure. Field 652 is a protected field (P) that, again, is set to a value of "1" to indicate that this LC is LLE encrypted (e.g., that octets 1-8 are LLE encrypted). The SF field in this case is set to a "1" to indicate that it is implicit (e.g., no explicit receive and transmit frequency designations are required). The Opcode field 604 may be set to a value of "000010", consistent with the P25 standard, to indicate that it is an implicit group voice channel update, or to a proprietary or newly assigned value to more specifically indicate that it is an LLE encrypted implicit group voice channel update. The Channel A field 656 includes an index that identifies a transmit/receive frequency pair on which the transmit and receive portions of the new LLE group call has been or is-to-be assigned. The Group Address A field 658 sets forth the target group address indicated in the new LLE group call request that was or is-to-be granted by the radio controller. In contrast to the LC 600 of FIG. 6A, because the LC 650 of FIG. 6B does not require the MFID 606 and service options 608 fields, it can announce two new granted or to-be-granted LLE group calls in a single LC. The Channel B field 660 includes an index that identifies a transmit/receive frequency pair on which the transmit and receive portions of a second new LLE group call has been or is-to-be assigned. The Group Address B field 662 sets forth the target group address indicated in a second new LLE group call request that was or is-to-be granted by the radio controller. Of course, other message structures that are partially or fully encrypted for announcing parameters regarding the granted or to-be-granted new LLE group call could be used as well.

FIG. 7 illustrates an unencrypted LLE group voice channel update LC 700 that may be transmitted consistent with a further embodiment of this disclosure. Field 702 is a protected field (P) that is set to a value of "0" to indicate that this LC is not LLE encrypted (e.g., that octets 1-8 are not LLE encrypted). The SF field in this case has no real bearing on the remaining contents of the message. The Opcode field 704 may be set to a proprietary value associated with an unprotected LLE group voice channel update. The remaining fields 706 include Group Index A-G fields, any one of which is updated, incremented, or otherwise modified each time a new LLE group call has been granted or is-to-be granted by the radio controller. For example, when the radio controller determines to grant the requested LLE group call at step 502, it may update a value of a randomly selected, algorithmically selected, or statically selected one of the Group Index fields to a new value to indicate that a new LLE group call has been or is-to-be granted. When a mobile station receives the LC 700 with a group index field containing a new or modified value relative to a previously received LC 700, it knows that a new LLE group call has been granted in the system and that it should return to the control or rest channel, or begin a channel scan, to locate the LLE encrypted call grant for the new LLE group call to obtain additional information necessary to determine whether to leave the non-LLE group call for the newly granted LLE group call. In this way, the radio controller can signify to mobile stations participating in a non-LLE group call that a new secure call has been granted without revealing sensitive information regarding the secure call, such as the channel assigned to the new LLE group call or a target group address associated with the new LLE group call, over the unsecure non-LLE channel that is supporting the non-LLE group call. Additionally, the LC 700 can be repeated with the same index values so that mobile stations that failed to receive a first transmission of the LC 700 can receive it anew, while those mobile stations that already received the first transmission can discard the second when it finds that the Group Index values in group index fields A-G are duplicative of an earlier received LC.

III. PROCESS OF RECEIVING NOTIFICATION AT A MOBILE STATION DURING A NON-LLE CALL OF A NEWLY GRANTED OR TO-BE-GRANTED LLE CALL

Figure 8:
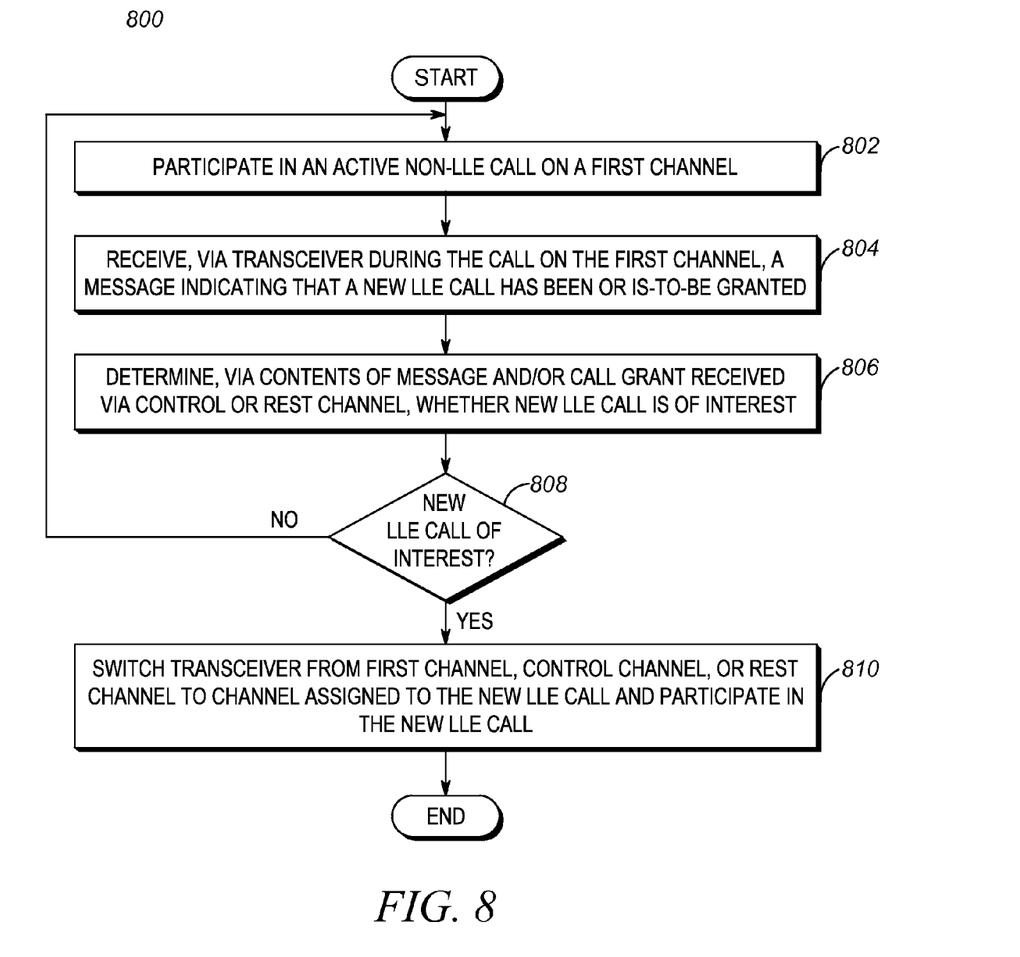
FIG. 8 is a flow chart setting forth an example process of a mobile station receiving an LLE call notification during a non-LLE call and determining whether to continue in the non-LLE group call or not, in accordance with an embodiment.

As set forth above, a mobile station, such as mobile station 205 of FIG. 2, may perform one or more steps in a process in response to receiving a notification of a newly granted or to-be-granted individual or group LLE call while participating in a non-LLE individual or group call. FIG. 8 sets forth a process 800 illustrating such steps.

At step 802, the mobile station participates in an active non-LLE call on a first channel via its transceiver. The first channel may be an assigned trunked traffic channel, for example, among other possibilities. The mobile station may be currently subscribed to (e.g., a member of) a first non-LLE group associated with an active non-LLE group call or participating in an individual non-LLE call. The first non-LLE group may be, for example, a traffic control or on-foot patrolman talkgroup.

In the group-based scenario, the mobile station may also be subscribed to a second LLE group that, for purposes of privacy, security, or some other reason, is configured to be encrypted. The second LLE group may be, for example, a building security or police commander talkgroup. Other examples are possible as well, and the mobile station may be subscribed to more than one non-LLE group and more than one LLE group in some embodiments.

In the individual call scenario, the mobile station may internally associate a source mobile station of the second LLE individual call with a higher priority than the current non-LLE individual call, or a higher priority of the second LLE individual call may be set by the source mobile station or the infrastructure and signalled to the target mobile station in the message sent to the target mobile station while participating in the non-LLE individual call. Of course, in other embodiments, the current non-LLE call may be a group call and the new LLE call an individual call, or vice versa. Other mechanisms for indicating priority are possible as well.

At step 804, the mobile station receives, via the transceiver and over the first channel, a message indicating that a new LLE group call (e.g., that has been or is-to-be assigned on a channel different from the first channel) has been or is-to-be granted by the radio controller. The message may be received as embedded in unencrypted call data or call audio of the active non-LLE group call, received in a signalling space available on the same channel as the active non-LLE group call (e.g., such as in a periodic or semi-periodic sync field or embedded signalling field), received during a call hang time of the active non-LLE group call, received in a MAC PDU or a termination link control message, received in an embedded low speed data slot on the same channel as the active non-LLE group call, or received via some other information conveying mechanism on the same channel as the active non-LLE group call. In some TDMA radio systems, the message may also be received in a traffic channel adjacent the current traffic channel (if available). Other possibilities exist as well.

At step 806, the mobile station determines, via the contents of the received message and/or additional call grant information received via the control or rest channel, whether the new LLE group call is of interest to the mobile station. For example, if the message received at step 804 is an encrypted message such as those set forth in FIG. 6A or 6B, including a target group address of the new LLE group call and an identity (explicit or implicit) of the channel on which the new LLE group call is-to-be conducted, the mobile station can determine whether the call is of interest based on the contents of the message alone without switching to another channel. More specifically, the mobile station can decrypt the message using a known LLE key previously received and stored at the mobile station, compare the target group address retrieved from the encrypted message to a list of subscribed group addresses, and determine if the target group address matches any of the one or more subscribed group addresses from the list. In addition, if the message includes priority information indicating a priority of the new LLE group call, the mobile station may compare a priority of the new LLE group call with a priority of the active non-LLE group call to determine if the new LLE group call is of a higher priority. In some embodiments, LLE calls may be statically determined to have a higher priority than non-LLE group calls.

If, on the other hand, the message received at step 804 is an unencrypted message such as that set forth in FIG. 7, and merely provides an indication of a new LLE group call granted or to be granted (e.g., via one or more incremented or otherwise modified index values), without specifically identifying the target group address of the new LLE group call and/or the channel(s) on which the new LLE group call will conducted, the mobile station may need to switch from the first channel on which the non-LLE group call is active to a control or rest channel in order to retrieve an encrypted call grant associated with the new LLE group call.

At step 808, the mobile station acts on the determination of step 806 using the information from the message and/or additional grant information retrieved from the control or rest channel in the system. If the mobile station determines that the new LLE group call is not of interest, processing proceeds back to step 802, where the mobile station continues to participate in the non-LLE group call on the first channel. In an embodiment in which an unencrypted message was received at step 804 and the mobile station switched to the control or rest channel to retrieve additional LLE group call grant information before switching back to the first channel, a small audio hole may occur in playback of the non-LLE group call at the mobile station. In an embodiment in which an encrypted message was received at step 804 with sufficient information to make a determination of whether the new LLE group call is of interest to the mobile station without switching to the control or rest channel to retrieve additional call grant information, no audio hole should occur in the non-LLE group call.

If, on the other hand, the mobile station determines that the new LLE group call is of interest, processing proceeds to step 810. At step 810, the mobile station switches its transceiver from the first channel to a channel assigned to the new LLE group call and continues to participate in the new LLE group call at the expense of the non-LLE group call. In an embodiment in which an unencrypted message was received at step 804 and the mobile station switched to the control or rest channel to retrieve additional LLE call grant information before switching back to the first channel, the mobile station may switch directly from the control or rest channel to the assigned channel for the new LLE group call, without returning to the first channel.

After the new LLE group call is completed on the assigned channel, the mobile station may return to an idle state on the assigned channel and await a new call grant or other signalling, return to the first channel and participate in the first non-LLE group call if it is still occurring, or may return to the control or rest channel and await a new call grant or other signalling there (e.g., including an indication that the non-LLE group call is still occurring on the first channel). Other possibilities exist as well.

III. CONCLUSION

In accordance with the foregoing, an improved method, apparatus, and system for securely notifying mobile stations participating in non-LLE group calls of the existence and/or identity of a new LLE group call is disclosed. As a result, mobile stations that are dual-subscribed to both LLE groups and non-LLE groups can make an informed determination of whether or not to continue in a non-LLE group call, and a more robust, useful, and efficient group communication system can be provided. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of interoperating link layer encrypted (LLE) and non-LLE communications in a radio network, the method comprising:
    receiving, at a radio controller, a new call request requesting an LLE call;
    determining, by the radio controller, that there are one or more currently active non-LLE calls; and
    causing, by the radio controller, a message to be transmitted on each channel carrying one of the one or more currently active non-LLE calls informing mobile stations participating in the non-LLE calls that a new LLE call has been or is-to-be granted;
    wherein the message is (i) at least partially LLE encrypted or (ii) not LLE encrypted and does not specifically identify the requested LLE call.

2. The method of claim 1, wherein the message is one of a link control (LC) message and a MAC packet data unit (PDU).

3. The method of claim 2, wherein the message is a LC message embedded in voice or data traffic associated with each respective currently active non-LLE call.

4. The method of claim 1, wherein the message is at least partially LLE encrypted.

5. The method of claim 4, wherein the message includes an indication of a traffic channel assigned for the new LLE call, and the indication is LLE encrypted.

6. The method of claim 5, wherein the requested LLE call is a group call, the request including a target group address, and the message including an LLE encrypted form of the target group address.

7. The method of claim 1, wherein the message is not LLE encrypted and does not specifically identify the requested LLE call.

8. The method of claim 7, wherein the message does not include an indication of a channel assigned for the new LLE call, but includes one or more modified sequence numbers, at least one of which is modified each time a new LLE call is granted in the radio network.

9. The method of claim 8, wherein the requested LLE call is a group call, the request including a target group address, and the message not identifying the target group address.

10. The method of claim 1, wherein the radio network operates in accordance with a P25 protocol.

11. The method of claim 1, wherein the one or more currently active non-LLE calls include a group non-LLE call and wherein the new LLE call is a group LLE call.

12. The method of claim 1, wherein the one or more currently active non-LLE calls include an individual non-LLE call and wherein the new LLE call is an individual LLE call.

13. A radio controller in a radio network, the radio controller comprising:
    a transceiver;
    a processor; and
    a computer readable medium having instructions stored thereon that, in response to execution by the processor, cause the radio controller to perform operations comprising:
        receiving, via the transceiver, a new call request requesting an LLE call;
        determining that there are one or more currently active non-LLE calls; and
        causing, via the transceiver, a message to be transmitted on each channel carrying one of the one or more currently active non-LLE calls informing mobile stations participating in the non-LLE calls that a new LLE call has been or is-to-be granted;
        wherein the message is (i) at least partially LLE encrypted or (ii) not LLE encrypted and does not specifically identify the requested LLE call.

14. The radio controller of claim 13, wherein the message is at least partially LLE encrypted.

15. The radio controller of claim 14, wherein the message includes an indication of a traffic channel assigned for the new LLE call, and the indication is LLE encrypted.

16. The radio controller of claim 15, wherein the requested LLE call is a group call, the request including a target group address, and the message including an LLE encrypted form of the target group address.

17. The radio controller of claim 13, wherein the message is not LLE encrypted and does not specifically identify the requested LLE call.

18. A mobile station in a radio network, the mobile station comprising:
- a transceiver;
- a processor; and
- a computer readable medium having instructions stored thereon that, in response to execution by the processor, cause the radio controller to perform operations comprising:
  - participating in an active non-link layer encrypted (LLE) call on a first channel;
  - receiving, via the transceiver during the call on the first channel, a message indicating that a new LLE call has been or is-to-be granted in the radio network;
  - determining, from one or both of (i) contents of the message and (ii) contents of an LLE-encrypted call grant received on a control channel in the radio network after switching from the first channel to the control channel in response to receiving the message, whether the new LLE call is of interest; and
  - responsive to determining that the new LLE call is of interest, switching the transceiver to a channel assigned to the new LLE call and participating in the new LLE call.

19. The mobile station of claim 18, wherein the message is LLE encrypted, the method further comprising LLE decrypting the message and identifying the assigned channel for the new LLE call.

20. The mobile station of claim 18, wherein the message is not LLE encrypted, the method further comprising switching from the first channel to the control channel, receiving the LLE-encrypted call grant over the control channel, decrypting the LLE-encrypted call grant, and identifying the assigned channel for the new LLE call.

* * * * *